US010925041B2

(12) United States Patent
Lee et al.

(10) Patent No.: US 10,925,041 B2
(45) Date of Patent: Feb. 16, 2021

(54) COMMON INDEXING FOR UPLINK PHYSICAL RESOURCE BLOCKS

(71) Applicant: QUALCOMM Incorporated, San Diego, CA (US)

(72) Inventors: Heechoon Lee, San Diego, CA (US); Peter Gaal, San Diego, CA (US); Wanshi Chen, San Diego, CA (US); Tao Luo, San Diego, CA (US); Peter Pui Lok Ang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 16/153,645

(22) Filed: Oct. 5, 2018

(65) Prior Publication Data

US 2019/0110287 A1    Apr. 11, 2019

Related U.S. Application Data

(60) Provisional application No. 62/570,073, filed on Oct. 9, 2017, provisional application No. 62/652,251, filed on Apr. 3, 2018.

(51) Int. Cl.
*H04W 72/04*  (2009.01)
*H04L 5/00*   (2006.01)
*H04L 5/14*   (2006.01)

(52) U.S. Cl.
CPC ....... *H04W 72/0413* (2013.01); *H04L 5/0044* (2013.01); *H04L 5/0053* (2013.01);
(Continued)

(58) Field of Classification Search
CPC ..... H04W 72/0413; H04L 5/0094; H04L 5/14
See application file for complete search history.

(56) References Cited

U.S. PATENT DOCUMENTS

2019/0182016 A1* 6/2019 Guo ...................... H04W 4/025

OTHER PUBLICATIONS

CATT: "Multiple SS block Transmission in Wideband", 3GPP Draft; R1-1712350 SS Burst Set Composition and SS Block Configuration, 3rd Generation Partnership Project (3GPP), Mobile Competence Centre; 650, Route Des Lucioles; F-06921 Sophia-Antipolis Cedex; France, vol. RAN WG1, No. Prague, Czechia; Aug. 21, 2017-Aug. 25, 2017 Aug. 20, 2017, XP051315166, Retrieved from the Internet: URL:http://www.3gpp.org/ftp/Meetings_3GPP_SYNC/RAN1/Docs/ [retrieved on Aug. 20, 2017], 8 pages.

(Continued)

*Primary Examiner* — Rhonda L Murphy
(74) *Attorney, Agent, or Firm* — Loza & Loza, LLP/Qualcomm

(57) ABSTRACT

Aspects and techniques relate to scheduling resources for uplink transmissions in wireless communication systems. In some examples, an allocation of resources for uplink may be based on a common reference resource (e.g., a reference physical resource block, PRB) also used for allocation of resources for downlink In other examples, allocation of resources for uplink may be based on a different reference resource. A scheduler may further provide an indication whether the same, common reference resource is used, or a different reference resource. A scheduler may further indicate a different reference resource as needed. Other aspects, embodiments, and features are also claimed and described.

30 Claims, 10 Drawing Sheets

(52) U.S. Cl.
CPC .............. H04L 5/0094 (2013.01); H04L 5/14 (2013.01); H04L 5/001 (2013.01)

(56) References Cited

OTHER PUBLICATIONS

Ericsson: "On Resource Allocation in the Frequency Domain", 3GPP Draft; R1-1711499 On Resource Allocation in the Frequency Domain, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017 Jun. 26, 2017, XP051300684, Retrieved from the Internet: URL:http://www.3gpp.org/ftp/Meetings_3GPP_SYNC/RAN1/Docs/ [retrieved on Jun. 26, 2017], 4 pages.

Huawei et al., "Overview of Wider Bandwidth Operations", 3GPP Draft; R1-1709972, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017 Jun. 26, 2017, XP051299197, Retrieved from the Internet: URL:http://www.3gpp.org/ftp/Meetings_3GPP_SYNC/RAN1/Docs/ [retrieved on Jun. 26, 2017], 9 pages.

International Search Report and Written Opinion—PCT/US2018/055022—ISA/EPO—dated Jan. 17, 2019.

Nokia et al., "Clarification on Sync/Channel Raster and BWP Reference Point", 3GPP Draft; R4-1711447 Channel Raster Definition, 3rd Generation Partnership Project (3GPP), Mobile Competence Centre; 650, Route Des Lucioles; F-06921 Sophia-Antipolis Cedex; France, vol. RAN WG4, No. Dubrovnik, Croatia; Oct. 8, 2017-Oct. 12, 2017 Oct. 8, 2017, XP051346157, Retrieved from the Internet: URL:http://www.3gpp.org/ftp/Meetings_3GPP_SYNC/RAN4/Docs/ [retrieved on Oct. 8, 2017], 4 pages.

NTT Docomo et al., "Work Plan for Rel-15 NR WI", 3GPP Draft; R1-1718177 RAN1 Work Plan for NR, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017 Oct. 8, 2017, XP051341359, Retrieved from the Internet: URL:http://www.3gpp.org/ftp/Meetings_3GPP_SYNC/RAN1/Docs/ [retrieved on Oct. 8, 2017], 174 pages.

\* cited by examiner

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Number of OFDM symbols per slot, $N^{slot}_{symb}$, for normal cyclic prefix.

| $\mu$ | $N^{slot}_{symb}$ | $N^{frame,\mu}_{slot}$ | $N^{subframe,\mu}_{slot}$ |
|---|---|---|---|
| 2 | 12 | 40 | 4 |

Number of OFDM symbols per slot, $N^{symb,\mu}_{slot}$, for extended cyclic prefix.

FIG. 5

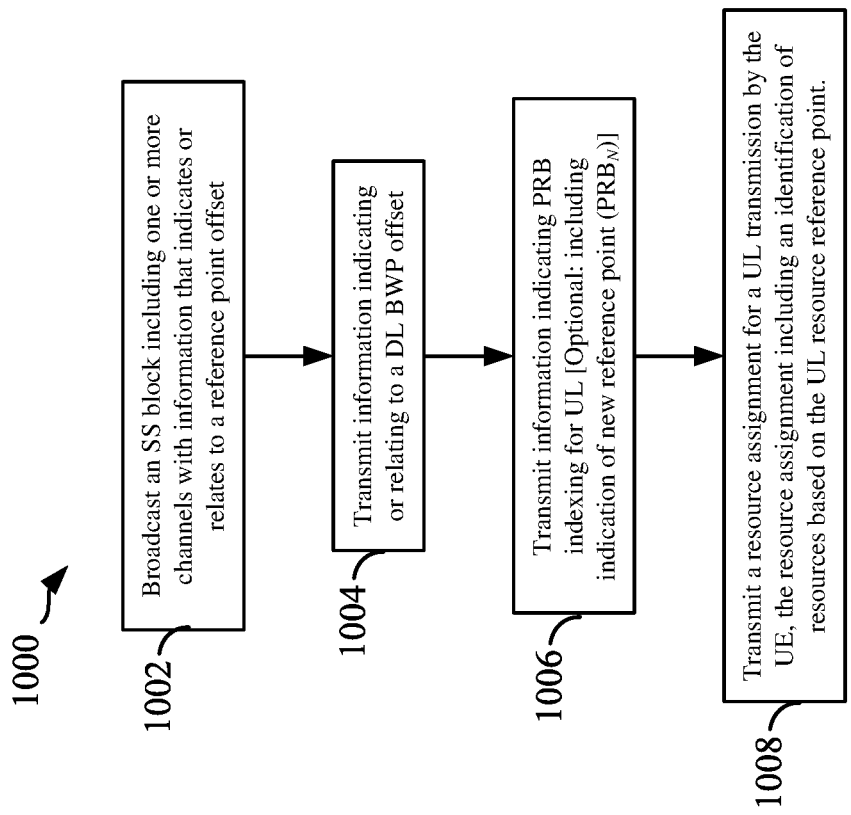

COMMON INDEXING FOR UPLINK PHYSICAL RESOURCE BLOCKS

PRIORITY CLAIM

This application claims priority to and the benefit of provisional patent application Nos. 62/570,073 (filed in the United States Patent and Trademark Office on Oct. 9, 2017) and 62/652,251 (filed in the United States Patent and Trademark Office on Apr. 3, 2018), the entire contents of said applications are incorporated herein by reference as if fully set forth below in their entireties and for all applicable purposes.

TECHNICAL FIELD

The technology discussed below relates generally to wireless communication systems, and more particularly, to a common index for uplink physical resource blocks (PRBs). Embodiments can provide and enable techniques for determining a common reference point for indexing PRBs on an uplink component carrier (e.g., for use in scheduling and/or for synchronization).

INTRODUCTION

The 3$^{rd}$ Generation Partnership Project (3GPP) is a standards body that defines specifications for certain wireless telecommunication networks. These include, but are not limited to 4$^{th}$ Generation (4G) "Long-Term Evolution" (LTE) networks, and 5$^{th}$ Generation (5G) "New Radio" (NR) networks. Certain areas of these standards relate to features to help with synchronization.

Synchronization in communication networks is useful to ensure different components can communicate effectively. For example, in LTE standards, a user equipment (UE) can locate sync signals (SS) and/or a physical broadcast channel (PBCH) because those signals are always located at a center frequency of the system bandwidth. In NR, this may not be the case. That is, according to current NR standards, a UE utilizes a sync raster to search a carrier for an SS block (which includes one or more SS's and may include a PBCH). When the SS block is located, the UE can synchronize with a cell and obtain system information for accessing the cell.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide a variety of schemes, algorithms, and methods for obtaining a PRB index to utilize for an uplink (UL) component carrier. In one example a method of wireless communication is disclosed. The method includes receiving, from a scheduling entity, a synchronization signal block (SSB) comprising information relating to a reference point offset. The method further includes determining a frequency of a first reference point, defined based on the reference point offset, relative to a frequency of the SSB. The method further includes receiving an uplink indexing indication configured to indicate whether to utilize the first reference point as an uplink (UL) resource reference point. Here, if the UL indexing indication indicates to utilize the first reference point as the UL resource reference point, the method includes determining an UL resource based on the first reference point. However, if the UL indexing indication indicates not to utilize the first reference point as the UL resource reference point, the method includes determining an UL resource based on a second reference point, different from the first reference point.

In another example a user equipment (UE) configured for wireless communication is disclosed. The UE includes at least one processor, a memory communicatively coupled to the at least one processor, and a transceiver communicatively coupled to the at least one processor. The at least one processor is configured to receive, from a scheduling entity via the transceiver, a synchronization signal block (SSB) comprising information relating to a reference point offset. The at least one processor is further configured to determine a frequency of a first reference point, defined based on the reference point offset, relative to a frequency of the SSB. The at least one processor is further configured to receive, via the transceiver, an uplink indexing indication configured to indicate whether to utilize the first reference point as an uplink (UL) resource reference point. Here, if the UL indexing indication indicates to utilize the first reference point as the UL resource reference point, the at least one processor is further configured to determine an UL resource based on the first reference point. However, if the UL indexing indication indicates not to utilize the first reference point as the UL resource reference point, the at least one processor is further configured to determine an UL resource based on a second reference point, different from the first reference point.

In another example a UE configured for wireless communication is disclosed. The UE includes means for receiving, from a scheduling entity, a synchronization signal block (SSB) comprising information relating to a reference point offset. The UE further includes means for determining a frequency of a first reference point, defined based on the reference point offset, relative to a frequency of the SSB. The UE further includes means for receiving an uplink indexing indication configured to indicate whether to utilize the first reference point as an uplink (UL) resource reference point. The UE further includes means for, if the UL indexing indication indicates to utilize the first reference point as the UL resource reference point, determining an UL resource based on the first reference point. The UE further includes means for, if the UL indexing indication indicates not to utilize the first reference point as the UL resource reference point, determining an UL resource based on a second reference point, different from the first reference point.

In another example a non-transitory computer-readable medium storing computer-executable code is disclosed. The computer-executable code includes instructions for causing a user equipment (UE) to receive, from a scheduling entity, a synchronization signal block (SSB) comprising information relating to a reference point offset. The computer-executable code includes instructions for causing a UE to determine a frequency of a first reference point, defined based on the reference point offset, relative to a frequency of the SSB. The computer-executable code includes instructions for causing a UE to receive an uplink indexing indication configured to indicate whether to utilize the first reference point as an uplink (UL) resource reference point. The computer-executable code includes instructions for causing a UE to, if the UL indexing indication indicates to utilize the first reference point as the UL resource reference point, determine an UL resource based on the first reference point. The computer-executable code includes instructions for causing a UE to, if the UL indexing indication indicates not to utilize the first reference point as the UL resource reference point, determine an UL resource based on a second reference point, different from the first reference point.

In another example a scheduling entity configured for wireless communication is disclosed. The scheduling entity includes at least one processor, a memory communicatively coupled to the at least one processor, and a transceiver communicatively coupled to the at least one processor. Here, the at least one processor is configured to broadcast, via the transceiver, a synchronization signal block (SSB) that includes one or more synchronization signals. The SSB further includes one or more channels, including information relating to a reference point offset. The at least one processor is further configured to transmit, via the transceiver, a UL indexing indication that indicates whether a UE is to utilize the first reference point as a UL resource reference point.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 5 shows tables illustrating features of slots with different numerologies according to some embodiments.

FIG. 10 is a flow chart illustrating a process for a scheduling entity to schedule a UL resource according to some aspects of the disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
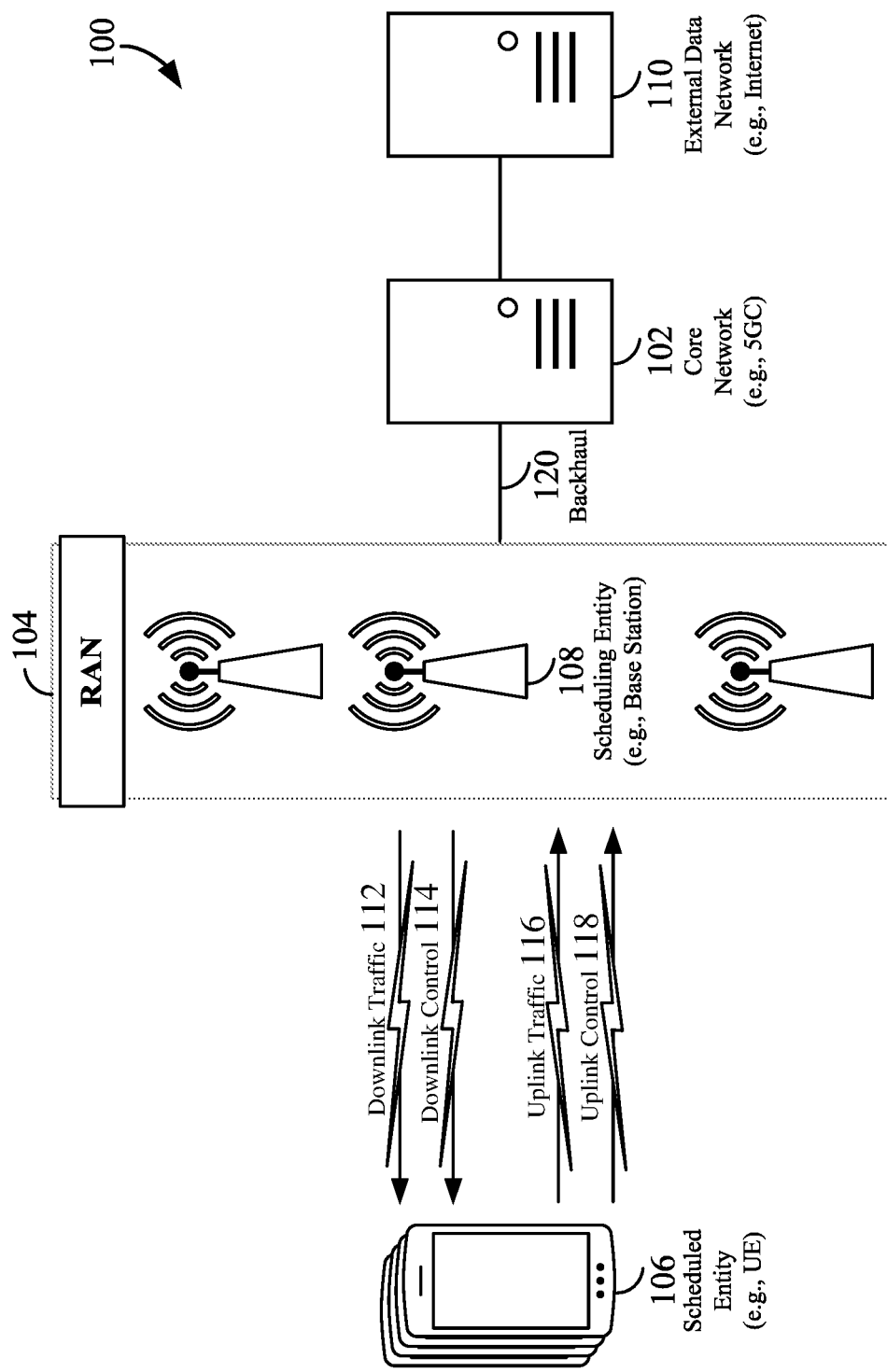
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
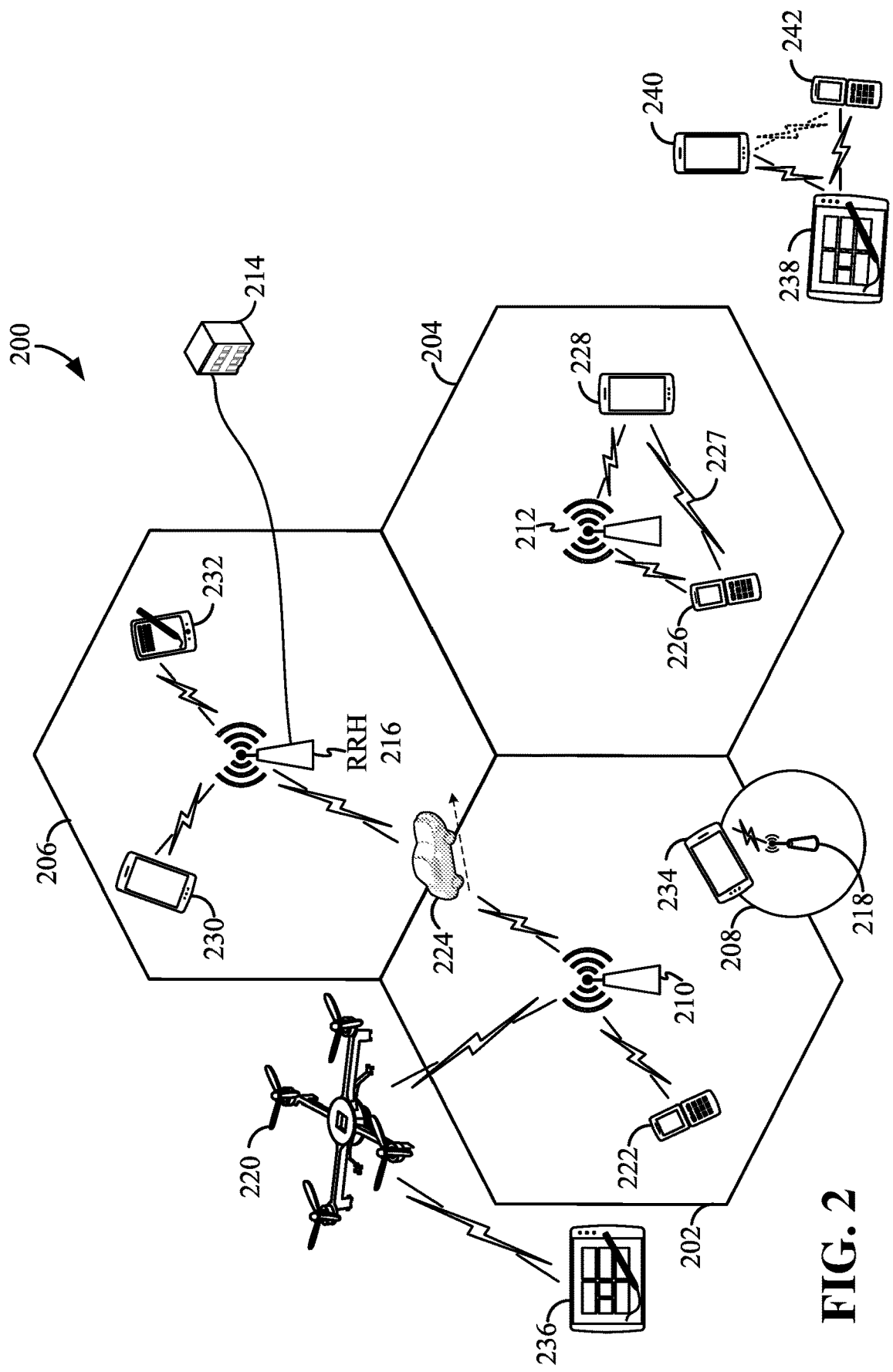
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different (e.g., paired) carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, unless otherwise indicated, when referring to frames, subframes, and slots, the terminology generally corresponds to 5G NR standards, such as 3GPP TS 38.212. For example, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
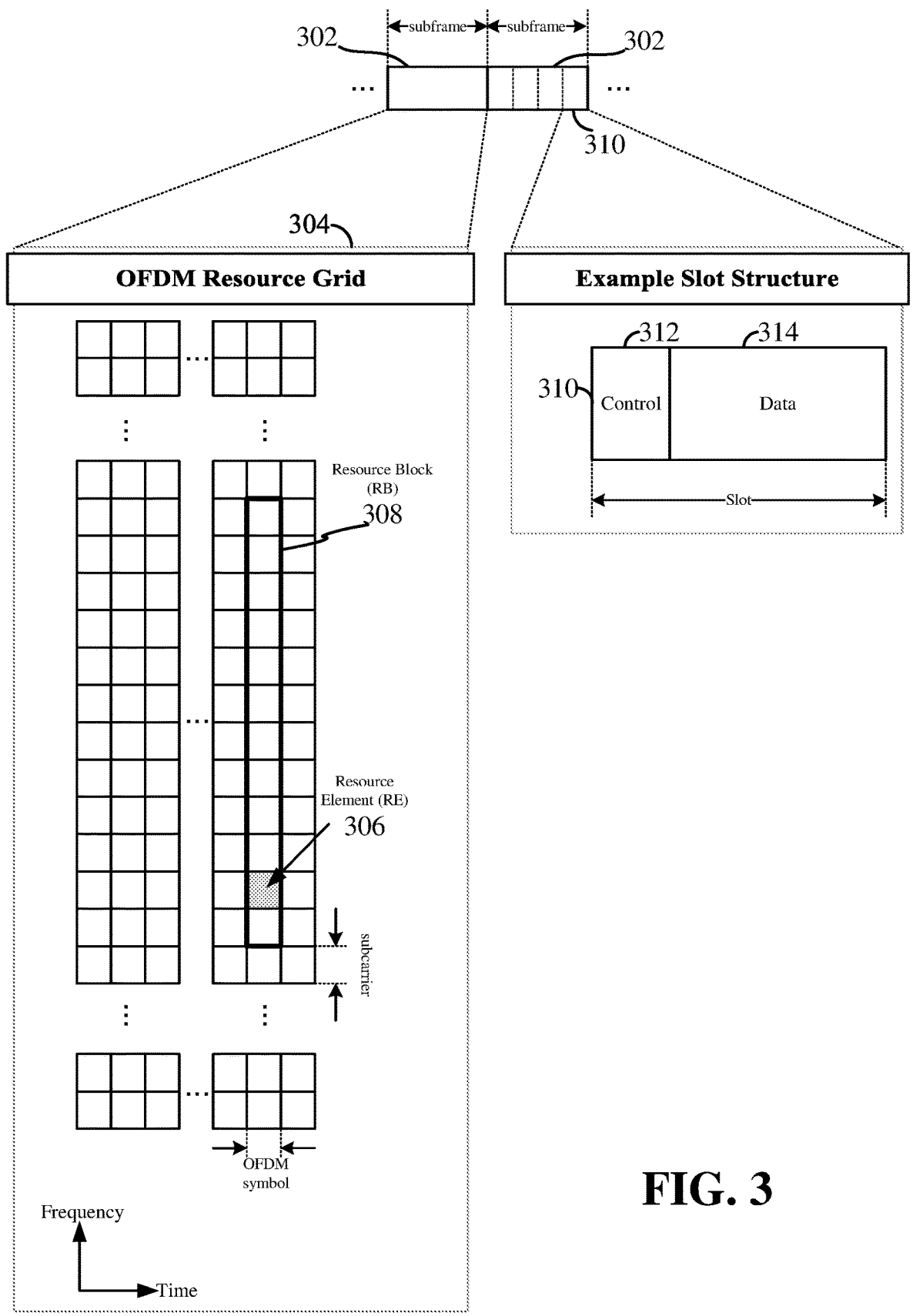
FIG. 3 is a schematic diagram illustrating organization of wireless resources in an air interface utilizing orthogonal frequency divisional multiplexing (OFDM) according to some embodiments.

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

Figure 6:
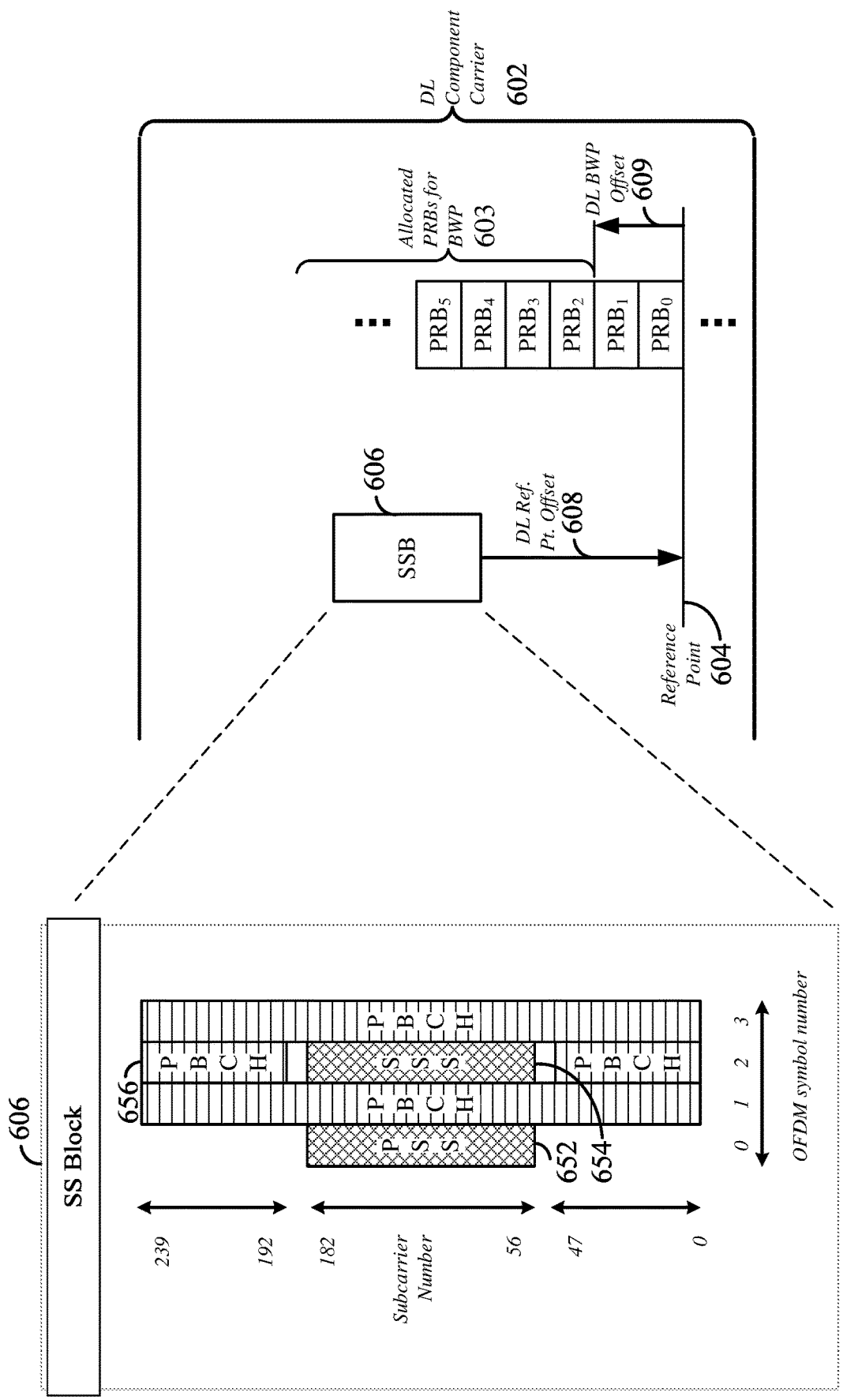
FIG. 6 is a schematic illustration of a physical resource block (PRB) indexing scheme where PRBs are indexed relative to an identified reference point, according to some examples.

Referring now to FIG. 6, the synchronization signals PSS 652 and SSS 654 (collectively referred to as SS), and in some examples, the PBCH 656, may be transmitted in an SS block (SSB) 606 that includes 4 consecutive OFDM symbols, numbered via a time index in increasing order from 0 to 3. In the frequency domain, the SS block 606 may extend over 240 contiguous subcarriers, with the subcarriers being numbered via a frequency index in increasing order from 0 to 239. Of course, the present disclosure is not limited to this specific SS block configuration. Other nonlimiting examples may utilize greater or fewer than two synchronization signals; may include one or more supplemental channel(s) in addition to the PBCH; may omit a PBCH; and/or may utilize nonconsecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 306 to carry UL control information 118 (UCI). The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include HARQ feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 4:
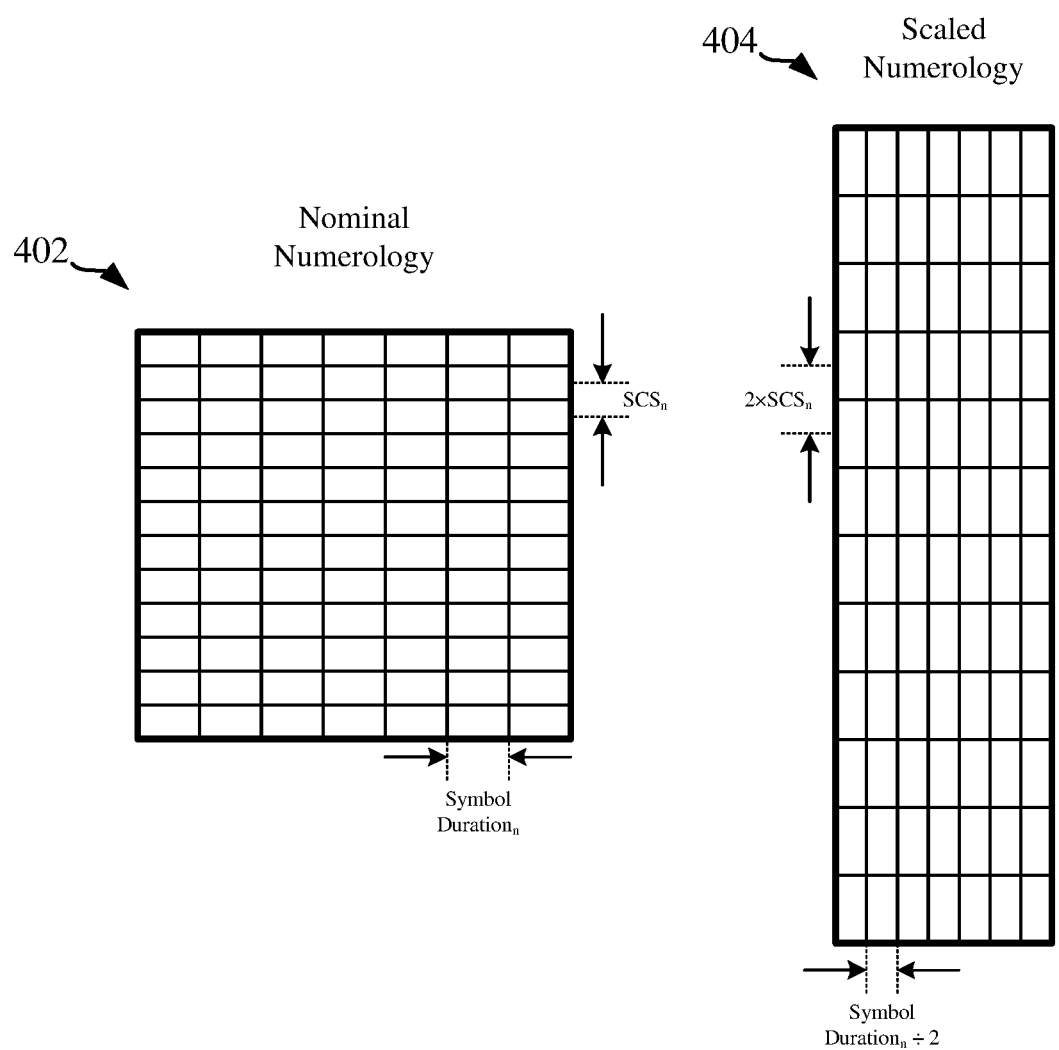
FIG. 4 is a schematic diagram of an OFDM air interface utilizing a scalable numerology according to some aspects of the disclosure.

To illustrate this concept of a scalable numerology, FIG. 4 shows a first RB 402 having a nominal numerology, and a second RB 404 having a scaled numerology. As one example, the first RB 402 may have a 'nominal' subcarrier spacing ($SCS_n$) of 30 kHz, and a 'nominal' symbol duration$_n$ of 333 μs. Here, in the second RB 404, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 404, the scaled numerology includes a scaled symbol duration of half the nominal symbol duration, or (symbol duration$_n$)÷2=167 μs.

FIG. 5 includes two tables illustrating how the numerology can alter the characteristics of a slot. The tables illustrate the number of symbols per slot, the number of slots per subframe, and the number of slots per frame for various configurations of the numerology μ and cyclic prefix (normal or extended).

In an aspect of this disclosure, a PRB index may be used to index PRBs across the bandwidth of a carrier. For example, a PRB index may be based on, or referenced from, the SS block, or any other suitable frequency reference point, with information indicating or relating to this reference point being delivered, e.g., via broadcast system information (SI); a PBCH; RMSI; and/or OSI.

In 4G LTE standards, the PBCH and SS (SS block) are always located at the center frequency of the system bandwidth. Accordingly, a UE can relatively easily detect the SS block and obtain the reference point, and based on that reference point, the UE can determine the location of a carrier. However, in 5G NR standards as they are currently defined, this may not be the case. That is, a carrier location and allocated resources in the frequency domain for a given UE may not be uniquely defined and may be provided separately to the UE.

In 5G NR networks, a PRB may be defined as a block of resource elements including 12 consecutive subcarriers in the frequency domain In current NR specifications, for the downlink (DL), PRBs may be indexed utilizing a common PRB indexing scheme, where each PRB is numbered (or indexed) from 0 to $N_\mu-1$ in the frequency domain. Here, $N_\mu$ corresponds to the maximum number of PRBs that may be provided within a system bandwidth for a given numerology $\mu$. Thus, the common PRB indexing for DL physical channels may be based on the maximum number of PRBs for a given numerology.

For example, common PRB indexing may be used for configuration of physical channels within a DL bandwidth part (BWP) when a UE is in RRC connected state. Here, a BWP is a contiguous subset of PRBs for a given numerology and a given carrier.

Referring once again to FIG. 6, an example of common PRB indexing that may be utilized to allocate resources for a downlink (DL) component carrier (CC) 602 or a BWP 603 is illustrated. In this example, the reference point 604 corresponds to $PRB_0$, which from the network's perspective, may be common to all the UEs sharing the wideband DL CC 602 regardless of whether they are narrowband or wideband UEs, or UEs that utilize carrier aggregation. According to an aspect of this disclosure, a scheduler (e.g., at a gNB) may utilize higher-layer signaling (e.g., RRC signaling, and/or any other suitable control signaling carried on the SS block, a PBCH, RMSI, and/or OSI) to provide an offset 608 from the lowest PRB of the SS block 606 accessed by the UE for initial cell selection, to the reference point 604 where $PRB_0$ starts. In this way, once a UE detects the SS block 606, and receives the offset indication 608, the UE may accordingly determine the frequency location of the reference point 604, or $PRB_0$.

While a scheme for common PRB indexing for configuration of a DL BWP 603 is described above, a further aspect of this disclosure provides a standard scheme for common PRB indexing for transmissions in the UL direction. For example, a scheduling entity (e.g., a gNB) may utilize such indexing for UL resource allocation for UL physical channels and/or signals on an UL CC.

Figure 7:
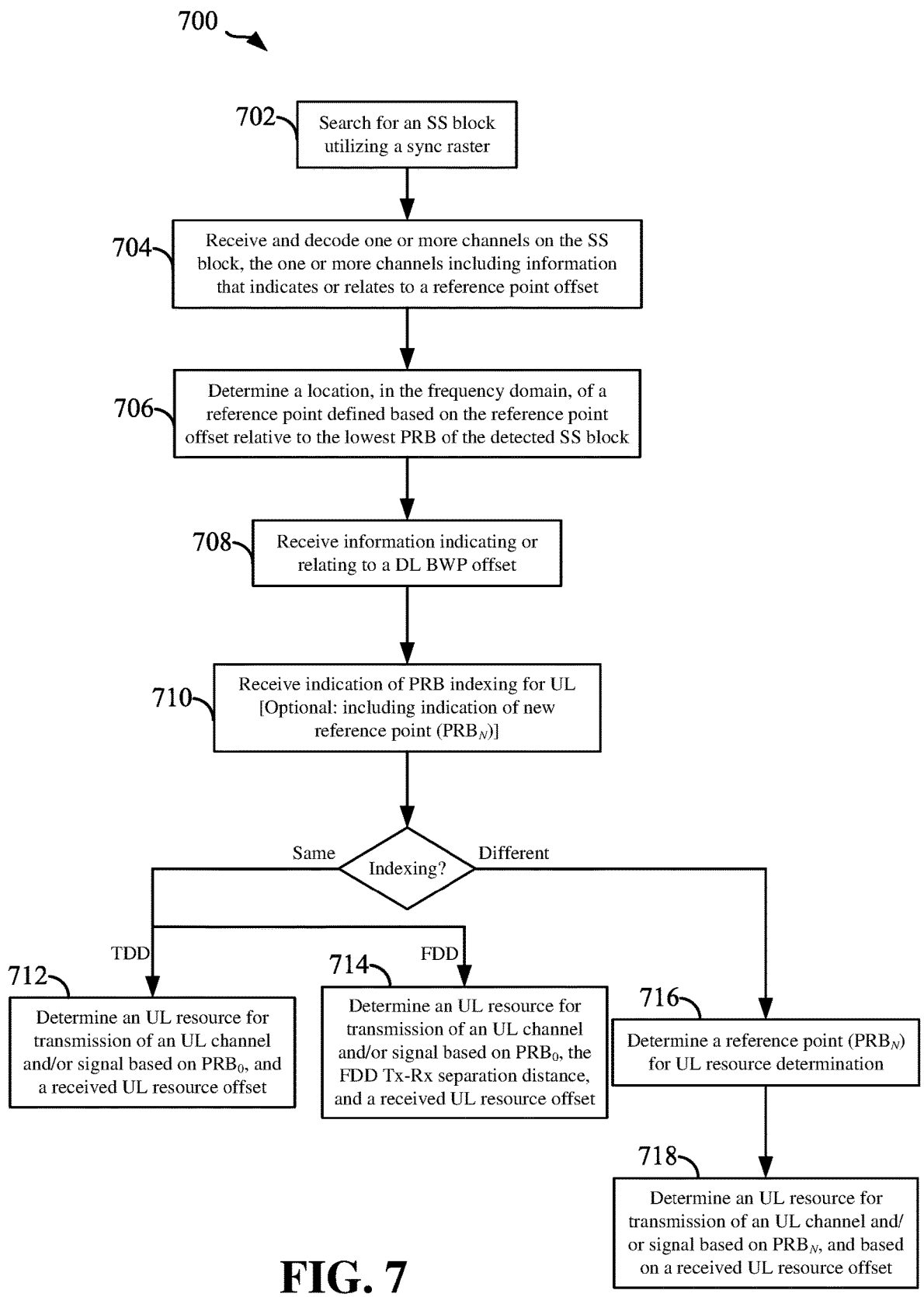
FIG. 7 is a flow chart illustrating a process for scheduling an uplink (UL) resource according to some aspects of the disclosure.

In various aspects of the present disclosure, a wireless communication system may support common PRB indexing for scheduling resources for an UL CC and/or BWP. For example, FIG. 7 is a flow chart illustrating an exemplary process 700 for common PRB indexing for scheduling an UL in accordance with some aspects of the present disclosure. As described below, some or all illustrated features may be omitted in a particular implementation within the scope of the present disclosure, and some illustrated features may not be required for implementation of all embodiments. In some examples, the process 700 may be carried out by the scheduling entity 800 illustrated in FIG. 8. In some examples, the process 700 may be carried out by any suitable apparatus or means for carrying out the functions or algorithm described below. With reference to the above description, for ease of reference, the below discussion of the process 700 will refer to a scheduling entity 108 and a scheduled entity or UE 106, described above and illustrated in FIG. 1.

According to some aspects of the present disclosure, the UL common indexing scheme described herein may be utilized for operations involving, for example, the physical uplink shared channel (PUSCH) and the sounding reference signal (SRS). That is, allocations of resources for these channels or signals may utilize the below-described algorithms. In some examples, allocations of resources for one or more other UL channels or signals may utilize the same algorithm, or a different algorithm than the below-described algorithms.

In general, a scheduling entity 108 (e.g., a gNB) may broadcast one or more SS blocks 606 over, within, via, or throughout a corresponding cell. To gain access to the information on the cell, a UE 106 may utilize a synchronization signal raster (sync raster) to locate an SS block 606 in a given cell. A sync raster may include a set of hypotheses corresponding to frequency positions over which the UE 106 may scan or search for an SS block 606 during system acquisition. As currently defined in 3GPP TS 38.101, a different sync raster may be defined for different bands and for different subcarrier spacings, with each raster's hypotheses being based on a first channel number, a last channel number, and a step size. However, within the scope of this disclosure, any suitable raster format may be utilized.

At block 702, a UE 106 may utilize such a sync raster to search for an SS block 606. With this sync raster, the UE 106 may tune its receiver to attempt to receive an SS block 606 at a given frequency in the air interface, re-tuning to the next candidate or hypothesis provided by the sync raster, until an SS block 606 is identified. As one non-limiting example, a UE 106 may have a raster with approximately 5 or 6 possible locations of the SS block 606 to search within a 100 MHz bandwidth. The size of the sync raster may vary according to different embodiments and/or implementations.

Once the UE 106 detects an SS block 606, at block 704 the UE 106 may receive and decode information that one or more channels on the SS block 606 may carry. For example, an SS block 606 including a PBCH 656 may carry information (e.g., a master information block, MIB, or any other suitable control signaling) pertaining to a carrier frequency, a subcarrier spacing, a slot timing, and/or other broadcast information to characterize a carrier, CC 602, or BWP 603.

According to an aspect of the present disclosure, the SS block 606 may include information that indicates, or pertains to, a reference point offset 608. In various aspects of the disclosure, the reference point offset 608 may be provided via higher-layer signaling, RRC signaling, NAS signaling, RMSI, OSI, or any other suitable control signaling. As one example, the UE 106 may receive information pertaining to the reference point offset 608 in RRC signaling carried on the PBCH 656 of the detected SS block 606. Thus, at block 706, the UE 106 may utilize this reference point offset 608 to determine a location, in the frequency domain, of a reference point 604, the reference point 604 being defined based on the reference point offset 608 relative to the lowest PRB of the SS block 606 that the UE 106 detected. Here, the reference point 604 (e.g., corresponding to $PRB_0$), may be a common reference point for all UEs sharing a CC 602 or BWP 603. That is, the signaling defining the reference point 604 may be cell-specific signaling.

At block 708, the UE 106 may receive information indicating or relating to a DL BWP offset 609. In various aspects of the disclosure, the DL BWP offset 609 may be provided via higher-layer signaling, RRC signaling, NAS signaling, RMSI, OSI, or any other suitable control signaling. As one example, the UE 106 may receive information pertaining to the DL BWP offset 609 in RRC signaling carried on the PBCH 656 of the detected SS block 606. Here, the UE 106 may utilize the DL BWP offset 604 to determine the lowest PRB of one or more BWPs in the carrier 602 for a DL channel and/or signal. As one example, the UE 106 may identify the lowest PRB (in the illustration of FIG. 6, $PRB_2$) of a DL BWP 603 by determining the PRB identified by the DL BWP offset 609, relative to the reference point 604 (e.g., $PRB_0$). Here, the signaling defining DL BWP offset 609 may be UE-specific signaling, rather than cell-specific signaling. That is, the scheduling entity 108 may provide different DL BWP offsets 609 to different UEs 106.

UL common indexing may be formatted in various manners. For example, in some aspects of the present disclosure, UL common indexing may take the same format and utilize the same reference (e.g., reference point 604) as DL common indexing, discussed above. In further aspects, UL common indexing may be based on, but not identical to the DL common indexing scheme. And in still further aspects, UL common indexing may utilize a different index than the index used for DL common indexing.

In various examples, a network may utilize any one of the above indexing schemes for UL resource assignments. However, in a further aspect of the disclosure, a given UE 106 may be configured to support more than one UL common indexing scheme. In such an example, an indication as to whether UL common indexing utilizes the same index or a different index than that used for DL resource assignment may be provided to the UE 106, for example, utilizing explicit signaling (e.g., a one-bit information element) from a scheduling entity 108. Such signaling may be carried utilizing any suitable broadcast and/or UE-specific (e.g., unicast) signaling, such as RRC signaling, MSI, RMSI, OSI, and/or DCI carried on a PDCCH. In another example, such explicit signaling may be omitted. That is, the UE may infer a UL indexing indication based on one or more known parameters or factors, including but not limited to a system type, a carrier configuration, a duplexing mode, etc.

Thus, referring again to FIG. 7, at block 710 the UE 106 may receive an indication of which PRB indexing scheme to utilize for the UL. For example, the PRB indexing indication may be configured to indicate that an UL assignment or resource allocation utilizes indexing based on the same reference point as used for defining the DL BWP ($PRB_0$), or indexing based on a different reference point ($PRB_N$). In some examples, if indexing based on a different reference point is indicated, the scheduling entity 108 may provide to the UE 106 an information element corresponding to the different reference point $PRB_N$ used for UL indexing.

With a TDD carrier, UL and DL transmissions are made on the same set of frequencies (e.g., CC 602), being separated from one another by time. Accordingly, a TDD carrier can be considered a symmetric carrier, with both UL and DL communications experiencing essentially the same channel characteristics. Thus, in some networks UL common indexing may utilize the same reference point 604 (e.g., $PRB_0$) as the reference point 604 utilized for DL common indexing. In the illustrated example of FIG. 7, if the PRB indexing indication indicates that the UL resource assignment is based on the same PRB indexing scheme as used for the DL resource assignment, and if the UL resource assignment is for a TDD carrier, then at block 712 the UE 106 may determine an UL resource for transmission of an UL channel or signal based on $PRB_0$ (the DL common index or reference point), and based on a received UL resource offset. For example, the scheduling entity 108 may provide to the UE 106 an UL resource offset in a resource assignment or grant for an UL transmission carried on the PDCCH. In another example, the UE 106 may utilize the same DL BWP offset for a determination of the resource for UL transmission. That is, in some examples, the UL resource offset may correspond to the DL BWP offset, without requiring transmission of a separate information element for the UL resource offset.

In a further aspect of this disclosure, an UL common index may be based on the same reference point utilized for DL common indexing in the case of paired carriers (e.g., an FDD carrier). In this example, the UL common index or reference point may be offset from the DL common index or reference point by an amount based on the Tx-Rx frequency separation between the respective UL and DL CCs of the FDD carrier. In the illustrated example of FIG. 7, if the PRB indexing indication indicates that the UL resource assignment is based on the same PRB indexing scheme as used for the DL resource assignment, and if the UL resource assignment is for an FDD carrier, then at block 714 the UE 106 may determine an UL resource for transmission of an UL channel or signal based on $PRB_0$ (the DL common index or reference point), and based on the FDD Tx-Rx separation distance and/or a received UL resource offset. For example, the scheduling entity 108 may provide to the UE 106 an UL resource offset in a resource assignment or grant for an UL transmission carried on the PDCCH. In some examples, the UL common index offset relative to the DL common index, and/or its relationship to the Tx-Rx frequency separation, may be defined for a given frequency band in NR specifications (e.g., predetermined). In other examples, the scheduling entity 108 may signal the Tx-Rx frequency separation to a UE 106 utilizing broadcast system information (e.g., remaining minimum system information (RMSI) and/or other system information (OSI)).

As another example, UL common indexing may utilize a different reference point, and a different indexing, than those utilized for DL common indexing. In particular, when the UL CC utilizes a different numerology than a DL CC, it is likely that the UL common index will be different from the DL common index. Additionally, a UE 106 may be configured to support different UL common indexing schemes for different system types. For example, for a network that utilizes an FDD carrier, the same common index may be utilized for DL common indexing and for UL common indexing; but for a network that utilizes a TDD carrier, the UL common indexing scheme may be either the same or different from the DL common index. Moreover, in the case of shared spectrum, a shared uplink (SUL) may utilize a different UL common index than the DL common index. Further, for the SUL, the reference point to utilize for UL indexing may be defined based on one of a plurality of options. For example, the reference point may be based on the absolute frequency (e.g., a channel number), or based on a paired CC's DL SS block index.

In the illustrated example of FIG. 7, if the PRB indexing indication indicates that the UL resource assignment is based on a different PRB indexing scheme than that used for the DL resource assignment, then at block 716 the UE 106 may determine an UL common index or reference point $PRB_N$.

For example, the reference point for the UL common index $PRB_N$ may be indicated to the UE utilizing broadcast system information (e.g., RMSI and/or OSI). This indication may be an explicit indication of the new reference point $PRB_N$, or in some examples, may be a value that the UE 106 may utilize to derive the new reference point. In still other examples, even when the different indexing scheme is being utilized, the UE 106 may not receive any explicit signaling indicating the new reference point $PRB_N$, and the UE may implicitly derive the reference point based on any other suitable parameter. For example, the reference point $PRB_N$ utilized for UL common indexing may additionally or alternatively be based on the PRB index of the DL SS block 606, or any other suitable reference (e.g., an independent reference) available to UEs. As one example, the PRACH may be utilized as a reference point. Further, at block 718 the UE 106 may determine an UL resource for transmission of an UL channel and/or signal based on $PRB_N$, and based on a received UL resource offset. For example, the scheduling entity 108 may provide to the UE 106 an UL resource offset in a resource assignment or grant for an UL transmission carried on the PDCCH.

Figure 8:
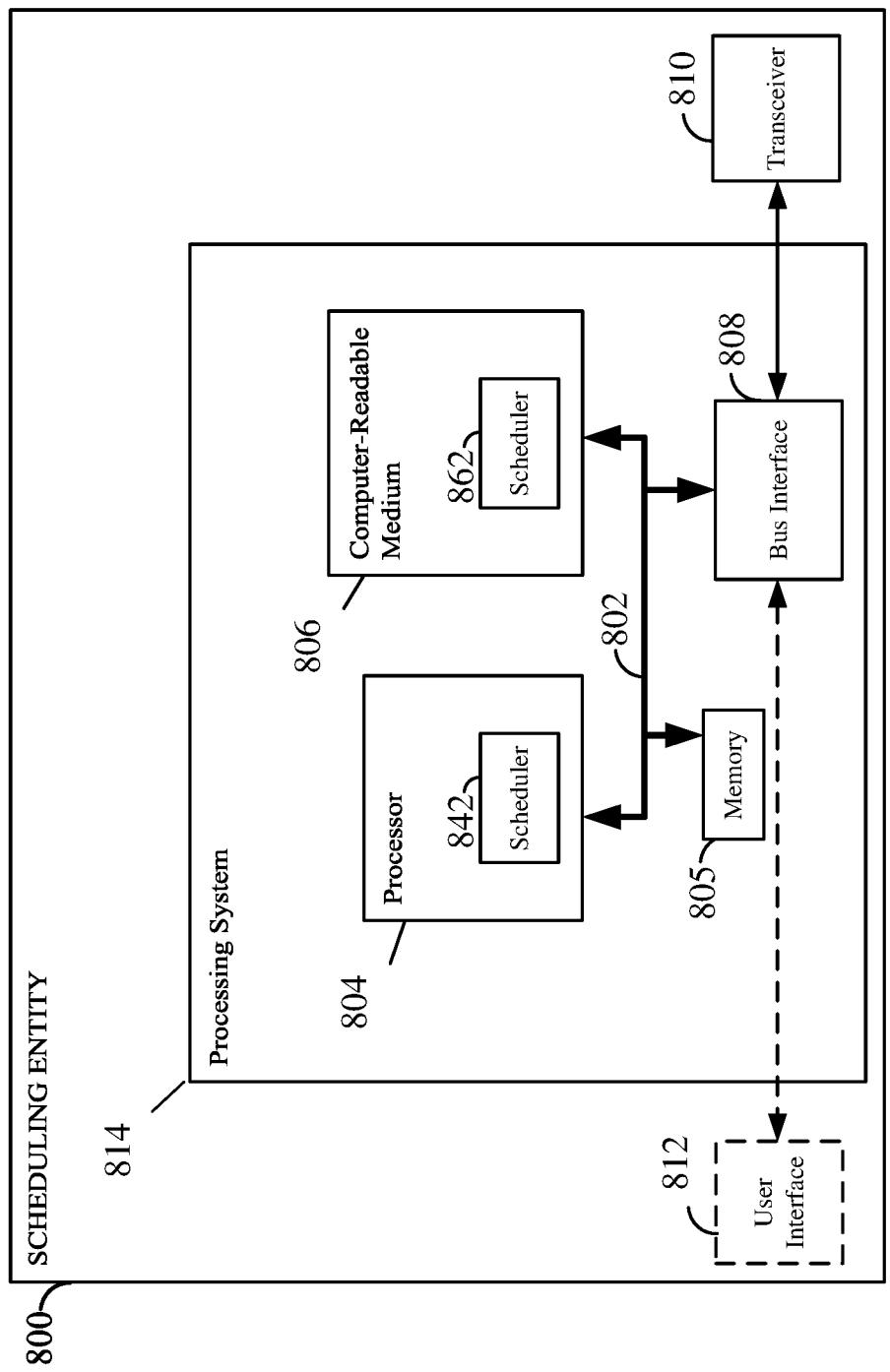
FIG. 8 is a block diagram conceptually illustrating an example of a hardware implementation for a scheduling entity according to some aspects of the disclosure.

FIG. 8 is a block diagram illustrating an example of a hardware implementation for a scheduling entity 800 employing a processing system 814. For example, the scheduling entity 800 may be a user equipment (UE) as illustrated in any one or more of FIGS. 1 and/or 2. In another example, the scheduling entity 800 may be a base station as illustrated in any one or more of FIGS. 1 and/or 2.

The scheduling entity 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 800 may be configured to perform any one or more of the functions described herein. That is, the processor 804, as utilized in a scheduling entity 800, may be used to implement any one or more of the processes and procedures described above and illustrated in FIG. 7.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided. Of course, such a user interface 812 is optional, and may be omitted in some examples, such as a base station.

In some aspects of the disclosure, the processor 804 may include scheduler circuitry 842 configured for various functions, including, for example, determining and communicating to a scheduled entity scheduling or grant information, including a scheduled resource, a resource reference point, a resource offset, a Tx-Rx frequency separation, etc., for uplink and downlink communication.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 806 may include scheduler software 862 configured for various functions, including, for example, determining and communicating to a scheduled entity scheduling or grant information, including a scheduled resource, a resource reference point, a resource offset, a Tx-Rx frequency separation, etc., for uplink and downlink communication.

Figure 9:
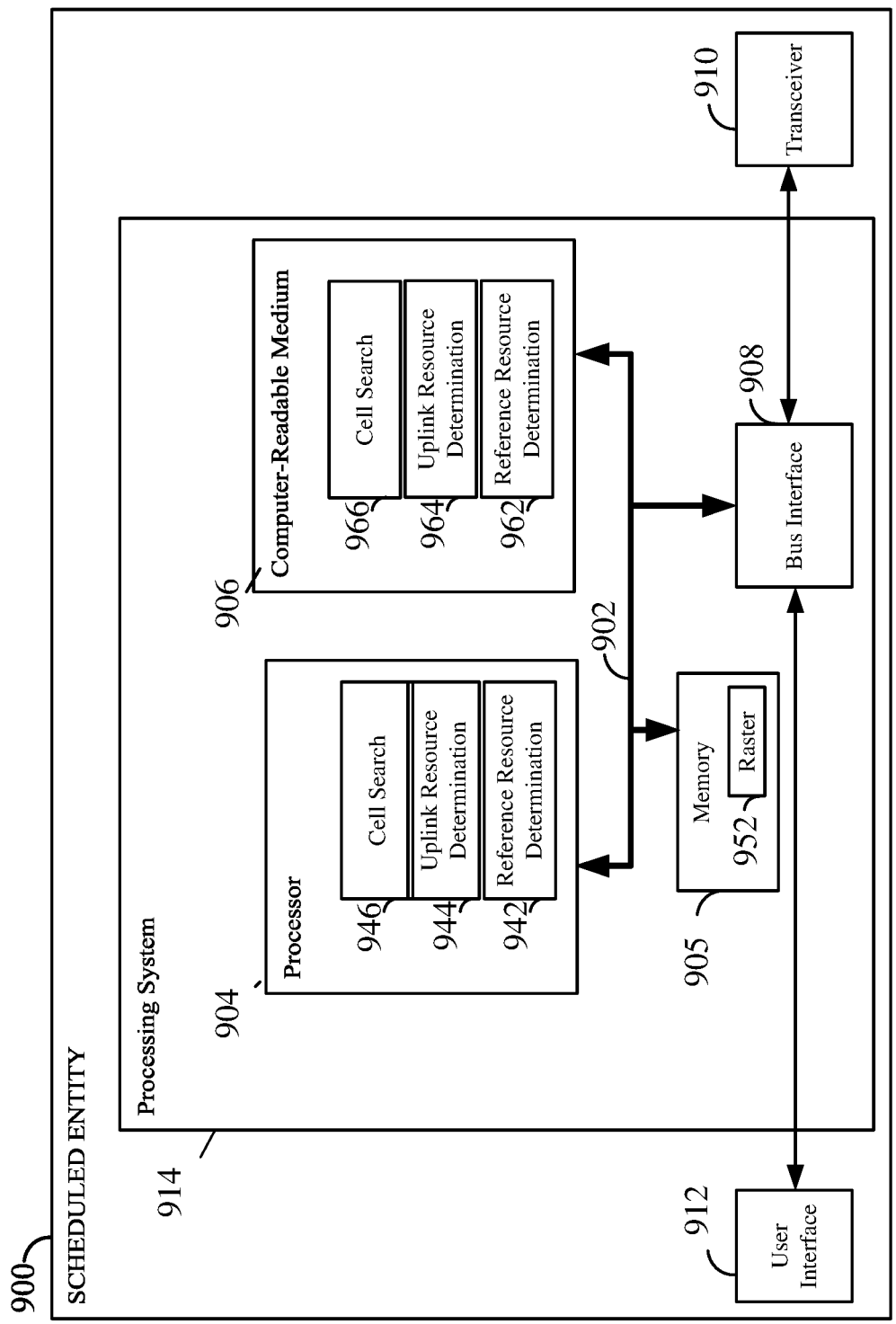
FIG. 9 is a block diagram conceptually illustrating an example of a hardware implementation for a scheduled entity according to some aspects of the disclosure.

FIG. 9 is a conceptual diagram illustrating an example of a hardware implementation for an exemplary scheduled entity 900 employing a processing system 914. In accordance with various aspects of the disclosure, an element, or any portion of an element, or any combination of elements may be implemented with a processing system 914 that includes one or more processors 904. For example, the scheduled entity 900 may be a user equipment (UE) as illustrated in any one or more of FIGS. 1 and/or 2.

The processing system 914 may be substantially the same as the processing system 814 illustrated in FIG. 8, including a bus interface 908, a bus 902, memory 905, a processor 904, and a computer-readable medium 906. Furthermore, the scheduled entity 900 may include a user interface 912 and a transceiver 910 substantially similar to those described above in FIG. 8. That is, the processor 904, as utilized in a scheduled entity 900, may be used to implement any one or more of the processes described above and illustrated in FIG. 7.

In some aspects of the disclosure, the processor 904 may include reference resource determination circuitry 942 configured for various functions, including, for example, identifying a reference resource (e.g., a reference point), which may correspond to an SS block, a PRB, a reference point offset, or any other suitable time-frequency resource or function of such resource. The reference resource determination circuitry 942 may further be configured to determine whether to utilize the same reference resource for both UL and DL scheduling, e.g., based on an indication from a scheduling entity 800. In a case where a different reference resource is to be utilized for UL scheduling, the reference resource determination circuitry 942 may utilize explicit control signaling from a scheduling entity 800 to determine a reference resource for the UL, separately from that for the DL scheduling. For example, the reference resource determination circuitry 942 may be configured to implement one or more of the functions described above in relation to FIG. 7, including, e.g., block 704, 706, 710, 712, 714, 716, and/or 718.

The processor 904 may further include UL resource determination circuitry 944 configured for various functions, including, for example, determining an UL resource for transmission of an UL channel and/or signal based on a suitable reference point, which may or may not be the same reference point as that used for DL resource determination. The UL resource determination circuitry 944 may further be configured for determining whether or not to utilize the same reference point as that used for DL resource determination, e.g., based on an UL indexing indication signaled from a scheduling entity 800. The UL resource determination circuitry 944 may utilize a suitable offset relative to the reference point to determine the resource, where the offset may be explicitly signaled from a scheduling entity 800, or implicitly derived from other parameters. In an FDD example, the UL resource determination circuitry 944 may further utilize a suitable Tx-Rx frequency separation to determine the resource, where the Tx-Rx frequency separation may be explicitly signaled from the scheduling entity 800, or implicitly derived from other parameters. For example, the UL resource determination circuitry 944 may be configured to implement one or more of the functions described above in relation to FIG. 7, including, e.g., blocks 712, 714, and/or 718.

The processor 904 may further include cell search circuitry 946 configured for various functions, including, for example, searching a cell for an SS block transmission. In some examples, the cell search circuitry 946 may search the entirety of the system bandwidth of the cell; and in other examples, the cell search circuitry 946 may utilize a raster 952 that includes a set of hypotheses of frequencies at which the SS block may be transmitted. For example, the cell search circuitry 946 may be configured to implement one or more of the functions described above in relation to FIG. 7, including, e.g., blocks 702 and/or 704.

In one or more examples, the computer-readable storage medium 906 may include reference resource determination software 962 configured for various functions, including, for example, identifying a reference resource (e.g., a reference point), which may correspond to an SS block, a PRB, a reference point offset, or any other suitable time-frequency resource or function of such resource. The reference resource determination software 962 may further be configured to determine whether to utilize the same reference resource for both UL and DL scheduling, e.g., based on an indication from a scheduling entity 800. In a case where a different reference resource is to be utilized for UL scheduling, the reference resource determination software 962 may utilize explicit control signaling from a scheduling entity 800 to determine a reference resource for the UL, separately from that for the DL scheduling. For example, the reference resource determination software 962 may be configured to implement one or more of the functions described above in relation to FIG. 7, including, e.g., block 704, 706, 710, 712, 714, 716, and/or 718.

The computer-readable storage medium 906 may further include uplink resource determination software 964 configured for various functions, including, for example, determining an UL resource for transmission of an UL channel and/or signal based on a suitable reference point, which may or may not be the same reference point as that used for DL resource determination. The UL resource determination software 964 may further be configured for determining whether or not to utilize the same reference point as that used for downlink resource determination, e.g., based on an uplink indexing indication signaled from a scheduling entity 800. The UL resource determination software 964 may utilize a suitable offset relative to the reference point to determine the resource, where the offset may be explicitly signaled from a scheduling entity 800, or implicitly derived from other parameters. In an FDD example, the UL resource determination software 964 may further utilize a suitable Tx-Rx frequency separation to determine the resource, where the Tx-Rx frequency separation may be explicitly signaled from the scheduling entity 800, or implicitly derived from other parameters. For example, the UL resource determination software 964 may be configured to implement one or more of the functions described below in relation to FIG. 7, including, e.g., blocks 712, 714, and/or 718.

The computer-readable storage medium 906 may further include cell search software 966 configured for various functions, including, for example, searching a cell for an SS block transmission. In some examples, the cell search software 966 may search the entirety of the system bandwidth of the cell; and in other examples, the cell search software 966 may utilize a raster 952 that includes a set of hypotheses of frequencies at which the SS block may be transmitted. For example, the cell search software 966 may be configured to implement one or more of the functions described above in relation to FIG. 7, including, e.g., blocks 702 and/or 704.

FIG. 10 is a flow chart illustrating an exemplary process 1000 for a scheduling entity, base station, gNB, or other suitable network node to assign UL resources for a UE based on a common UL indexing algorithm in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the scheduling entity 800 illustrated in FIG. 8. In some examples, the process 1000 may be carried out by any suitable apparatus or means for carrying out the functions or algorithm described below.

At block 1002, the scheduling entity 800 may broadcast an SSB (e.g., the SSB 606). The SSB 606 may include one or more synchronization signals and one or more channels that include information relating to a reference point offset (e.g., the DL reference point offset 608). At block 1004, the scheduling entity 800 may transmit information indicating or relating to a DL BWP offset 609. At block 1006 the scheduling entity 800 may transmit an UL indexing indication. The UL indexing indication may be configured to indicate whether a UE is to utilize the first reference point as a UL resource reference point. Here, particularly in the event that the UE is not to utilize the first reference point as the UL resource reference point, the scheduling entity 800 may further include an indication of a new reference point (e.g., $PRB_N$) to act as the UL resource reference point. At block 1008, the scheduling entity may transmit a resource assignment or grant for an UL transmission by the UE. Here, the resource assignment may include an identification of resources based on the UL resource reference point. That is, if the UE is to utilize the first reference point offset or DL reference point offset, then the resource assignment for the UL transmission is based on the first reference point offset. However, if the UE is not to utilize the first reference point offset or DL reference point offset, then the resource assignment for the UL transmission is based on the second (new) reference point.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-9 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-9 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
receiving, from a scheduling entity, a synchronization signal block (SSB) comprising information relating to a reference point offset;
determining a frequency of a first reference point, defined based on the reference point offset, relative to a frequency of the SSB;
receiving an uplink indexing indication configured to indicate whether to utilize the first reference point as an uplink (UL) resource reference point;
if the UL indexing indication indicates to utilize the first reference point as the UL resource reference point, determining an UL resource based on the first reference point; and
if the UL indexing indication indicates not to utilize the first reference point as the UL resource reference point, determining an UL resource based on a second reference point, different from the first reference point.

2. The method of claim 1, further comprising:
searching a carrier for the SSB utilizing a raster that comprises a set of hypotheses of frequencies at which the SSB may be transmitted.

3. The method of claim 1, further comprising:
receiving, from the scheduling entity, a downlink (DL) bandwidth part (BWP) offset relative to the first reference point, the DL BWP offset configured to identify resources for a DL BWP.

4. The method of claim 1, wherein the UL indexing indication indicates to utilize the first reference point as the UL resource reference point, and wherein the determining the UL resource is further based on a received UL resource offset, relative to the first reference point.

5. The method of claim 4, wherein the first reference point corresponds to a DL component carrier in a frequency division duplex (FDD) carrier, and
wherein the determining the UL resource is further based on a frequency separation distance between the DL component carrier and an UL component carrier of the FDD carrier.

6. The method of claim 1, wherein the UL indexing indication indicates not to utilize the first reference point as the UL resource reference point, the method further comprising:
receiving information relating to the UL resource reference point, corresponding to the second reference point,
wherein the determining the UL resource is further based on a received UL resource offset, relative to the second reference point.

7. The method of claim 6, wherein the UL indexing indication further comprises the information relating to the UL resource reference point.

8. The method of claim 7, wherein the UL indexing indication is received via unicast signaling.

9. The method of claim 1, wherein the first reference point is a common reference point, common to a plurality of user equipment (UEs) sharing resources provided by the scheduling entity.

10. The method of claim 1, further comprising:
receiving information relating to an offset relative to one of the first reference point or the second reference point, wherein the offset corresponds to a frequency of the UL resource, offset relative to one of the first reference point or the second reference point,
wherein the information is carried on one of radio resource control (RRC) signaling, non-access stratum (NAS) signaling, a master information block (MIB), a system information block (SIB), a minimum system information (MSI), remaining minimum system information (RMSI), other system information (OSI), or downlink control information (DCI) corresponding to a UL grant.

11. A user equipment (UE) configured for wireless communication, comprising:
at least one processor;
a memory communicatively coupled to the at least one processor; and
a transceiver communicatively coupled to the at least one processor,
wherein the at least one processor is configured to:
receive, from a scheduling entity via the transceiver, a synchronization signal block (SSB) comprising information relating to a reference point offset;
determine a frequency of a first reference point, defined based on the reference point offset, relative to a frequency of the SSB;
receive, via the transceiver, an uplink indexing indication configured to indicate whether to utilize the first reference point as an uplink (UL) resource reference point;
if the UL indexing indication indicates to utilize the first reference point as the UL resource reference point, determine an UL resource based on the first reference point; and
if the UL indexing indication indicates not to utilize the first reference point as the UL resource reference point, determine an UL resource based on a second reference point, different from the first reference point.

12. The UE of claim 11, wherein the at least one processor is further configured to search a carrier for the SSB utilizing a raster that comprises a set of hypotheses of frequencies at which the SSB may be transmitted.

13. The UE of claim 11, wherein the at least one processor is further configured to receive, from the scheduling entity via the transceiver, a downlink (DL) bandwidth part (BWP) offset relative to the first reference point, the DL BWP offset configured to identify resources for a DL BWP.

14. The UE of claim 11, wherein the UL indexing indication indicates to utilize the first reference point as the UL resource reference point, and
wherein the at least one processor, being configured to determine the UL resource, is further configured to determine the UL resource based on a received UL resource offset relative to the first reference point.

15. The UE of claim 14, wherein the first reference point corresponds to a DL component carrier in a frequency division duplex (FDD) carrier, and
wherein the at least one processor, being configured to determine the UL resource, is further configured to determine the UL resource based on a frequency separation distance between the DL component carrier and an UL component carrier of the FDD carrier.

16. The UE of claim 11, wherein the UL indexing indication indicates not to utilize the first reference point as the UL resource reference point, and wherein the at least one processor is further configured to:
receive, via the transceiver, information relating to the UL resource reference point, corresponding to the second reference point,
wherein the at least one processor, being configured to determine the UL resource, is further configured to determine the UL resource based on a received UL resource offset, relative to the second reference point.

17. The UE of claim 16, wherein the UL indexing indication further comprises the information relating to the UL resource reference point.

18. The UE of claim 17, wherein the UL indexing indication is received via unicast signaling.

19. The UE of claim 11, wherein the first reference point is a common reference point, common to a plurality of user equipment (UEs) sharing resources provided by the scheduling entity.

20. The UE of claim 11, wherein the at least one processor is further configured to:
receive, via the transceiver, information relating to an offset relative to one of the first reference point or the second reference point, wherein the offset corresponds to a frequency of the UL resource, offset relative to one of the first reference point or the second reference point, wherein the information is carried on one of radio resource control (RRC) signaling, non-access stratum (NAS) signaling, a master information block (MIB), a system information block (SIB), a minimum system information (MSI), remaining minimum system information (RMSI), other system information (OSI), or downlink control information (DCI) corresponding to a UL grant.

21. A non-transitory computer-readable medium storing computer-executable code, comprising instructions for causing a user equipment (UE) to:
receive, from a scheduling entity, a synchronization signal block (SSB) comprising information relating to a reference point offset;
determine a frequency of a first reference point, defined based on the reference point offset, relative to a frequency of the SSB;
receive an uplink indexing indication configured to indicate whether to utilize the first reference point as an uplink (UL) resource reference point;
if the UL indexing indication indicates to utilize the first reference point as the UL resource reference point, determine an UL resource based on the first reference point; and
if the UL indexing indication indicates not to utilize the first reference point as the UL resource reference point, determine an UL resource based on a second reference point, different from the first reference point.

22. The non-transitory computer-readable medium of claim 21, further comprising instructions for causing the UE to search a carrier for the SSB utilizing a raster that comprises a set of hypotheses of frequencies at which the SSB may be transmitted.

23. The non-transitory computer-readable medium of claim 21, further comprising instructions for causing the UE to receive, from the scheduling entity, a downlink (DL) bandwidth part (BWP) offset relative to the first reference point, the DL BWP offset configured to identify resources for a DL BWP.

24. The non-transitory computer-readable medium of claim 21, wherein the UL indexing indication indicates to utilize the first reference point as the UL resource reference point, and
wherein the instructions for causing the UE to determine the UL resource are further configured to determine the UL resource based on a received UL resource offset, relative to the first reference point.

25. The non-transitory computer-readable medium of claim 24, wherein the first reference point corresponds to a DL component carrier in a frequency division duplex (FDD) carrier, and
wherein the instructions for causing the UE to determine the UL resource are further configured to determine the UL resource based on a frequency separation distance between the DL component carrier and an UL component carrier of the FDD carrier.

26. The non-transitory computer-readable medium of claim 21, wherein the UL indexing indication indicates not to utilize the first reference point as the UL resource reference point, the method further comprising:
instructions for causing the UE to receive information relating to the UL resource reference point, corresponding to the second reference point,
wherein the instructions for causing the UE to determine the UL resource are further configured to determine the UL resource based on a received UL resource offset, relative to the second reference point.

27. The non-transitory computer-readable medium of claim 26, wherein the UL indexing indication further comprises the information relating to the UL resource reference point.

28. The non-transitory computer-readable medium of claim 27, wherein the UL indexing indication is received via unicast signaling.

29. The non-transitory computer-readable medium of claim 21, wherein the first reference point is a common reference point, common to a plurality of user equipment (UEs) sharing resources provided by the scheduling entity.

30. The non-transitory computer-readable medium of claim 21, further comprising:
instructions for causing the UE to receive information relating to an offset relative to one of the first reference point or the second reference point, wherein the offset corresponds to a frequency of the UL resource, offset relative to one of the first reference point or the second reference point,
wherein the information is carried on one of radio resource control (RRC) signaling, non-access stratum (NAS) signaling, a master information block (MIB), a system information block (SIB), a minimum system information (MSI), remaining minimum system information (RMSI), other system information (OSI), or downlink control information (DCI) corresponding to a UL grant.

* * * * *